United States Patent [19]

Gerken

[11] Patent Number: 4,464,094
[45] Date of Patent: Aug. 7, 1984

[54] TURBINE ENGINE COMPONENT AND METHOD OF MAKING THE SAME

[75] Inventor: John M. Gerken, Chagrin Falls, Ohio

[73] Assignee: TRW Inc., Cleveland, Ohio

[21] Appl. No.: 36,188

[22] Filed: May 4, 1979

[51] Int. Cl.³ .............................................. F01D 9/02
[52] U.S. Cl. ..................................... 415/217; 164/122
[58] Field of Search .................. 415/216, 217; 164/60, 164/122, 125–128, 361, 137, 23, 26, 30

[56] References Cited

U.S. PATENT DOCUMENTS

| | | | |
|---|---|---|---|
| 1,470,503 | 10/1923 | Steenstrup | 415/216 |
| 1,470,508 | 10/1923 | Steenstrup | |
| 1,547,838 | 6/1925 | Steenstrup | 415/216 |
| 2,110,679 | 3/1938 | Robinson | 415/217 |
| 3,260,505 | 7/1966 | Ver Snyder | 416/241 |
| 3,485,291 | 12/1969 | Piearcey | 164/127 |
| 3,494,709 | 2/1970 | Piearcey | 415/216 X |
| 3,650,635 | 3/1972 | Wachtell et al. | 415/115 |
| 3,724,531 | 4/1973 | Erickson et al. | 164/361 |
| 3,751,180 | 8/1973 | Cameron | 415/217 X |
| 3,848,654 | 11/1974 | Boyle et al. | 164/137 X |
| 3,909,157 | 9/1975 | Wachtell et al. | 415/217 |
| 3,969,805 | 7/1976 | Lievens et al. | 29/156.8 R |
| 4,034,182 | 7/1977 | Schlosser et al. | 219/121 EM |
| 4,043,379 | 8/1977 | Blazek | 164/23 |
| 4,063,939 | 12/1977 | Weaver et al. | 75/208 R |
| 4,066,116 | 1/1978 | Blazek et al. | 164/137 X |
| 4,195,396 | 4/1980 | Blazek | 164/60 X |

FOREIGN PATENT DOCUMENTS 207310 11/1923 United Kingdom ............... 415/217

OTHER PUBLICATIONS

Translation of Relevant Passages Appearing in Foreign Citations.

Primary Examiner—Leonard E. Smith
Attorney, Agent, or Firm—Yount & Tarolli

[57] ABSTRACT

The present invention provides a new and improved method of making an improved turbine engine component having an annular array of airfoils connected wth inner and outer shrouds. The airfoils are cast separately from the shrouds to enable the airfoils and shrouds to be made from either the same or different materials. The airfoils advantageously have an elongated columnar grain structure with grain boundaries extending parallel to the leading and trailing edges of the airfoils. The inner and outer shrouds are formed of a plurality of arcuate sections which also may have an elongated columnar grain structure. The ends of the arcuate shroud sections are interconnected in such an orientation that the grain boundaries extend circumferentially around the circular shrouds to minimize the extent to which ends of the grains are exposed. In another embodiment of the invention, each of the arcuate shroud sections is formed of a single crystal. In accordance with a feature of the invention, the forming of a shroud segment which includes a pair of arcuate shroud sections and one or more airfoils is facilitated by using a spacer bar. The spacer bar holds the shroud sections in a fixed spatial relationship relative to each other while airfoils are connected with the shroud sections. Once the airfoils have been connected with the shroud sections, the spacer bar is removed.

43 Claims, 9 Drawing Figures

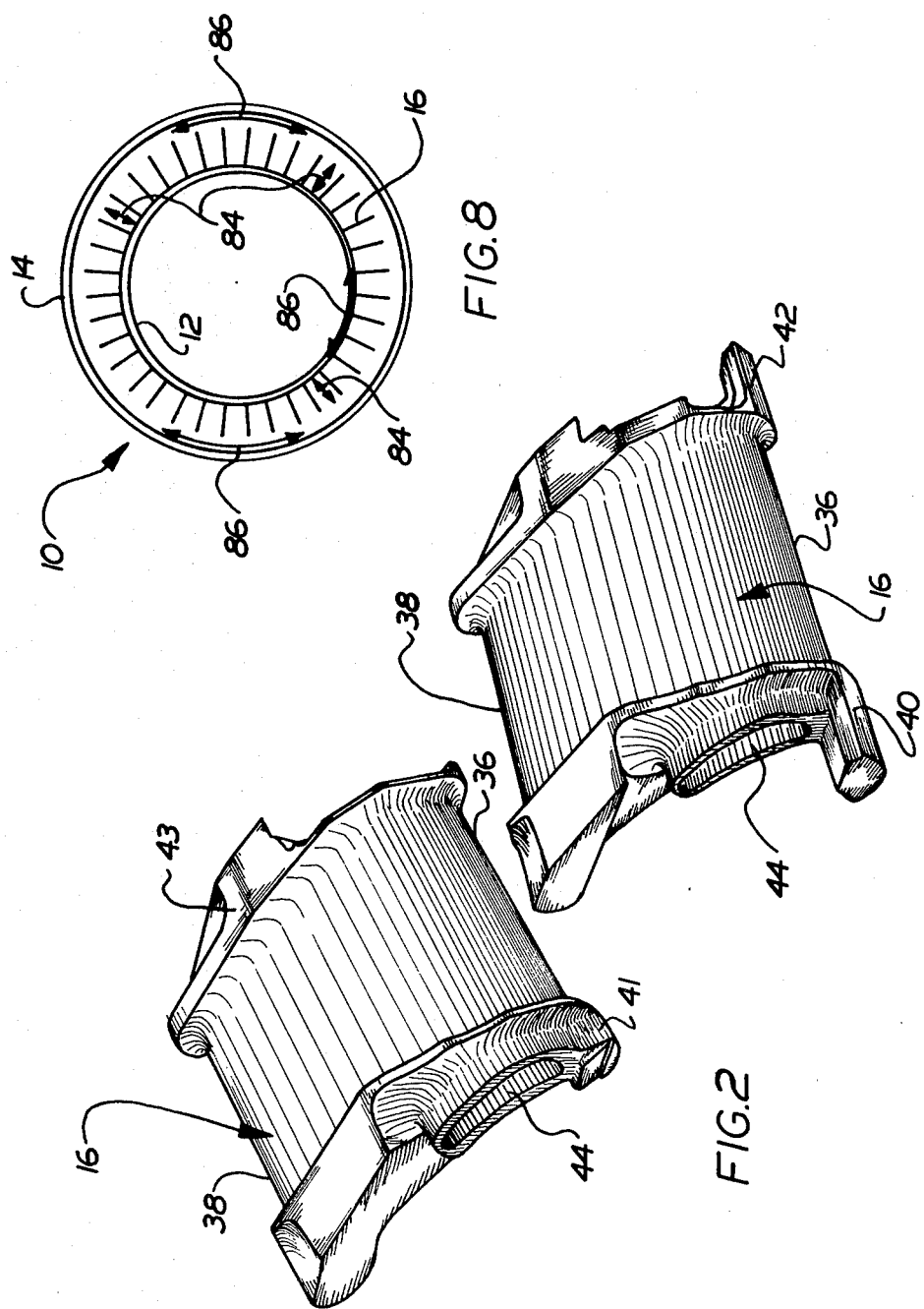

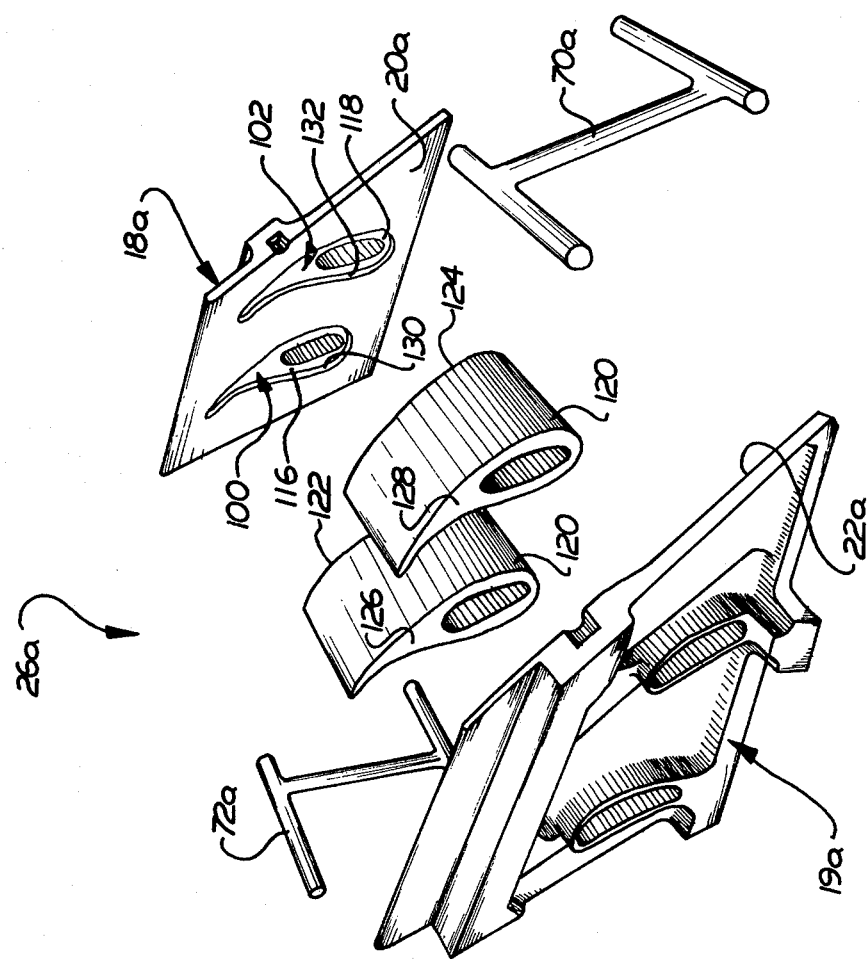

TURBINE ENGINE COMPONENT AND METHOD OF MAKING THE SAME

BACKGROUND OF THE INVENTION

The present invention relates to a turbine engine component and the method by which it is made.

In making components for turbine engines, airfoils or vanes have been made separately from shrouds to which they are subsequently attached. It is well known that the strength and corrosion resistance of these airfoils can be enhanced by having the grain boundaries oriented parallel to the longitudinal axes of the airfoils, that is, perpendicular to the direction of gas flow across the airfoils.

In the past, the shrouds of turbine engine components have been cast with a fine, equiaxed grain structure. These shrouds have substantially uniform metallurgical properties in every direction. However during operation of a turbine engine, the forces to which the shrouds are subjected are usually greater in one direction than another direction.

It is also a known practice to form inner and outer shrouds from a plurality of sections. When this is done, opposite ends of an airfoil are connected to a pair of shroud sections. The various pairs of shroud sections are then interconnected to form a turbine engine component having an annular array of airfoils disposed between a pair of circular shrouds. When this practice is being followed, difficulty may be encountered in maintaining the shroud sections in the desired relationship with each other while an airfoil is connected with the shroud sections.

Difficulties have also been encountered in casting arcuate sections of the shrouds integrally with the airfoils. By directional solidification techniques, it has been possible to produce an elongated columnar grain structure extending parallel to the longitudinal axes of the airfoils when they are cast integrally with the shroud sections. However, the grains in the shroud sections are oriented perpendicular to the major side surfaces of the shroud sections. This results in the grain ends in the shrouds being exposed to the flow of hot gases through the turbine engine component.

SUMMARY OF THE INVENTION

The present invention provides a new and improved method of making a new and improved turbine engine component. The turbine engine component includes an annular array of airfoils which are connected with inner and outer shrouds. The airfoils are cast separately from the shrouds. This allows the airfoils to be directionally solidified according to known techniques. The directional solidification results in an elongated columnar grain structure with grain boundaries extending parallel to the leading edges of the airfoils.

The circular inner and outer shrouds are advantageously formed of a plurality of arcuate sections. In accordance with a feature of the invention, shroud sections may be cast and directionally solidified to form an elongated, columnar grain structure. The ends of the arcuate shroud sections are interconnected in such an orientation that the grain boundaries extend circumferentially around the circular shrouds. By orienting the grains in this direction, the ends of grains are not exposed to the hot flow of gases to enhance the resistance of the shroud sections to corrosion and thermal fatigue. Although the directionally solidified shroud sections may be connected with any desired type of airfoil, they are advantageously used with directionally solidified airfoils.

In another embodiment of the invention, each of the arcuate shroud sections is formed of a single crystal. By forming each arcuate shroud section as one crystal, the high temperature strength and corrosion resistance of the shroud section is enhanced. The single crystal shroud sections are interconnected to form circular inner and outer shrouds which are connected with airfoils.

In accordance with still another feature of the present invention, the forming of a vane segment which includes a pair of arcuate shroud sections and one or more airfoils is greatly facilitated by using one or more spacer bars. The spacer bars hold the shroud sections in a fixed spatial relationship relative to each other while airfoils are connected with the shroud sections. Once the airfoils have been connected with the shrouds sections, which may be done by brazing them in place, the spacer bars are removed. In one embodiment of the invention, the spacer bar and a pair of arcuate shroud sections are cast as one piece. In another embodiment, the spacer bars are formed separately from and subsequently connected with, the shroud sections.

Accordingly, it is an object of this invention to provide a new and improved method of making a turbine engine component or similar assembly and wherein inner and outer shroud sections are held in a predetermined spatial relationship with each other by a spacer bar while opposite end portions of an airfoil are connected with the shroud sections.

Another object of this invention is to provide a new and improved method in accordance with the preceding object and wherein each of the shroud sections is either formed of a single metal crystal or is formed of directionally solidified metal.

Another object of this invention is to provide a new and improved turbine engine component or similar assembly and wherein an airfoil extends between a pair of shroud sections each of which is either formed of a single crystal or has an elongated columnar grain structure.

Another object of this invention is to provide a new and improved turbine engine component or similar assembly and wherein an annular array of airfoils is disposed between a pair of circular shrouds and in which each of the shrouds has an elongated columnar grain structure with the grain boundaries extending circumferentially around the shroud.

Another object of this invention is to provide a new and improved turbine engine component or similar assembly and wherein an annular array of airfoils is disposed between a pair of circular shrouds and in which each of the shrouds includes a plurality of sections each of which is formed of a single crystal of metal.

BRIEF DESCRIPTION OF THE DRAWINGS

These and other objects and features of the present invention will become more apparent to those skilled in the art to which it pertains upon reading the following description taken together with the accompanying Figures in which:

FIG. 2 is an illustration of a pair of airfoils used in the turbine engine component of FIG. 1;

FIG. 6 is an exploded illustration of an assembly which includes inner and outer shroud sections, airfoils, and spacer bars and illustrating the configuration of airfoil receiving sockets in the shroud sections;

FIG. 8 is a schematic plan view of the turbine engine component of FIG. 1 in which arcuate arrows indicate lines of grain orientation in the inner and outer shrouds and in which radial arrows indicate lines of grain orientation in the airfoils; and FIG. 9 is a schematic view of another embodiment of the invention in which the shrouds are axially spaced from each other and in which arcuate arrows indicate lines of grain orientation in the shrouds and in which axial arrows indicate lines of grain orientation in the airfoils.

DESCRIPTION OF PREFERRED EMBODIMENTS

Figure 1:
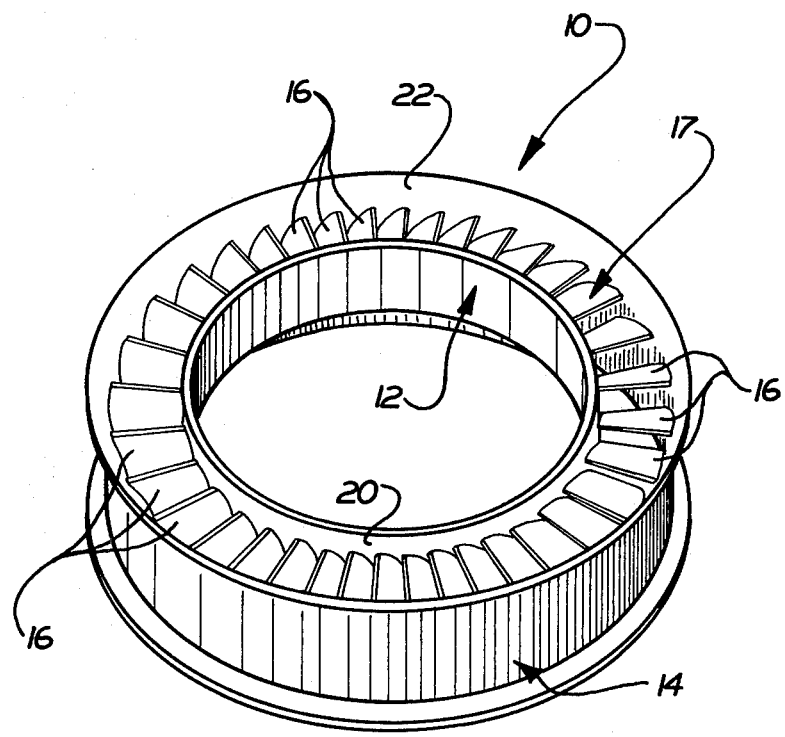
FIG. 1 is schematized pictorial illustration of a turbine engine component having an annular array of airfoils disposed between inner and outer shrouds.
Figure 3:
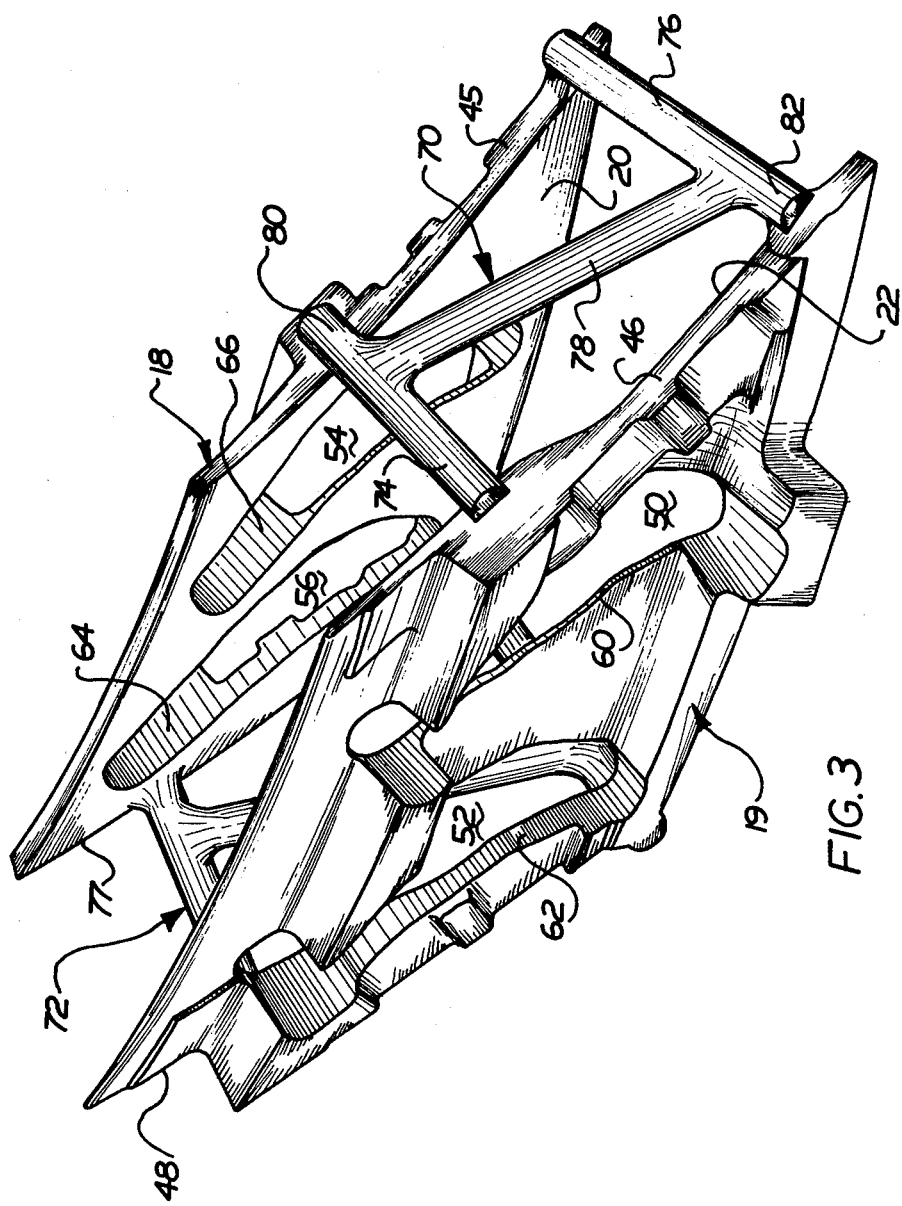
FIG. 3 is an illustration of an assembly which includes inner and outer shroud sections which form part of the shrouds of FIG. 1 and which are interconnected by spacer bars to maintain the shroud sections in a fixed spatial relationship with each other.
Figure 4:
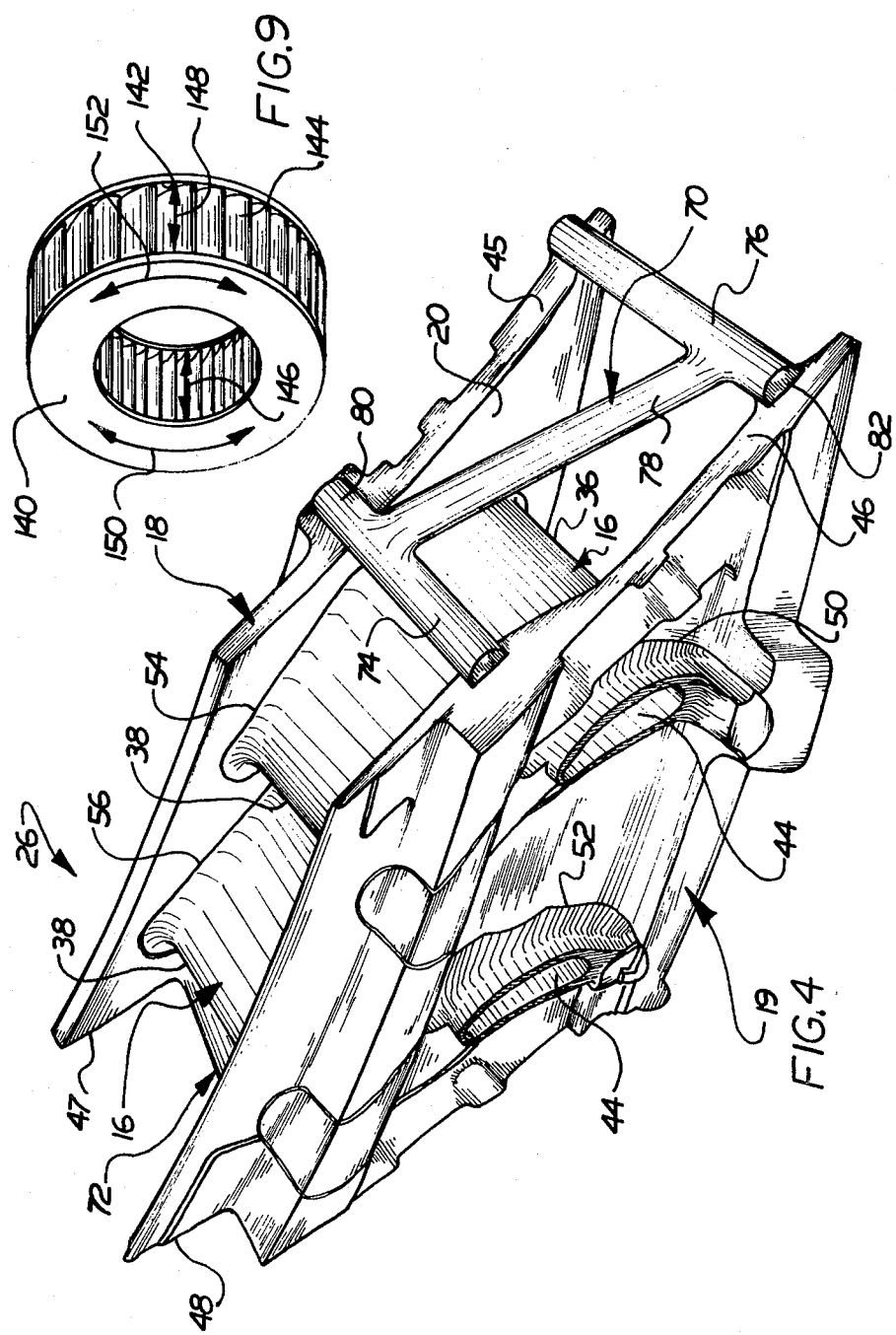
FIG. 4 is an ilustration of the assembly of FIG. 3 after the airfoils of FIG. 2 have been connected with the shroud sections.
Figure 5:
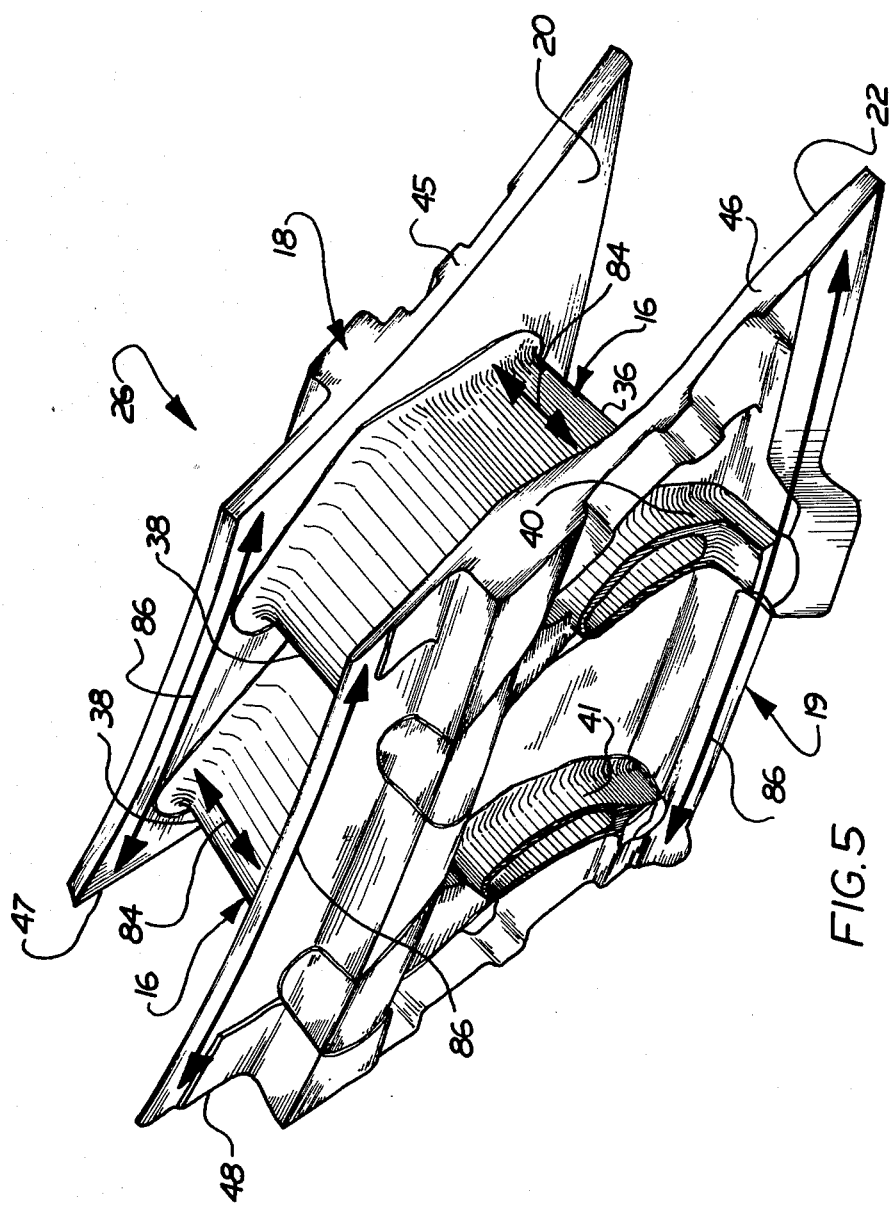
FIG. 5 is an illustration of the assembly of FIG. 4 after the spacer bars have been removed.

A turbine engine component or assembly 10 is illustrated in FIG. 1. The turbine engine component 10 includes a circular radially inner shroud 12 and a circular radially outer shroud 14 which is disposed in a coaxial relationship with the inner shroud. A plurality of airfoils 16 (FIGS. 1-2) are disposed in an annular array 17 (FIG. 1) between the shrouds 12 and 14. In the illustrated embodiment of the invention, the circular inner shroud 12 is formed by interconnecting arcuate inner shroud sections 18 (FIGS. 3-5). Similarly, the circular outer shroud 14 is formed by interconnecting arcuate outer shroud sections 19.

As is well known, turbine engine components come into contact with a flow of high temperature gasses. The annular radially outer major side surface 20 (FIG. 1) of the inner shroud 12 and the annular radially inner major side surface 22 of the outer shroud 14 guide the flow of gasses. The gasses flowing between the major side surfaces 20 and 22 of the inner and outer shrouds 12 and 14 are deflected by the airfoils 16 which extend between the shrouds. Since the major side surfaces 20 and 22 are exposed to the flow of hot gases, it is important that the shrouds 12 and 14 be resistant to high temperature corrosion.

To facilitate accurate construction of the relatively large diameter turbine engine component 10, a plurality of turbine segments 26 (FIG. 5) are utilized. Each of the turbine segments 26 includes parallel inner and outer shroud sections 18 and 19 (FIG. 5) and a pair of airfoils 16. The arcuate turbine segments 26 are joined in a circular array by connecting the shroud sections 18 and 19 to inner and outer rings to form the circular component 10.

To withstand the thermal and mechanical stresses imposed on the turbine component 10, the turbine segments 26 are made of superalloys. Examples of such superalloys may be found in U.S. Pat. Nos. 4,063,939 and 3,260,505. The physical properties of superalloys are a function of their microstructure, that is, the size and arrangement of crystals or grains within the alloy.

There are known techniques for producing different microstructures in superalloys. It is possible to cast an article in such a manner that it is formed of a single crystal of a superalloy. Such a method is disclosed in U.S. Pat. No. 3,724,531. A single crystal casting has its greatest strength in the direction of crystal growth.

It is also possible through a technique known as directional solidification to produce elongated grains in a cast article in which all the grain boundaries are substantially parallel. In a directionally solidified casting the strength in a direction parallel to the grain boundaries and the direction of grain growth is greater than with a similar equiaxed grain growth. Directional solidification techniques are discussed in U.S. Pat. Nos. 3,485,291 and 3,260,505.

In order to take advantage of the different physical properties which may be produced by different casting techniques, the airfoils 16 (FIG. 2) of the turbine segment 26 (FIG. 5) are produced separately from the inner and outer shroud sections 18 and 19. By casting the airfoils 16 separately from the shroud sections 18 and 19 it is possible to achieve a microstructure in the airfoils which is different from the microstructure in the shroud sections. It is also possible to form the airfoils 16 of a metal which has a different composition than the metal used in the shroud sections 18 and 19. In addition, in some applications, the surfaces of the turbine segment 26 (FIG. 5) which are exposed to hot gas flow may be coated with a protective coating before the turbine segment is assembled. These coatings are applied utilizing line-of-sight techniques which are more easily accomplished on individual parts than on completed assemblies or subassemblies.

The airfoils 16 (FIG. 2) are formed of a superalloy and have a directionally solidified microstructure produced by known techniques. Thus, the airfoils 16 are produced by directional solidification techniques. Directional solidification provides an elongated columnar grain structure with longitudinally extending and generally parallel grain boundaries. In order to maximize the durability of the airfoils 16, the grain boundaries are substantially parallel to the leading and trailing edges 36 and 38 of the airfoils. As is well known, this microstructure provides good resistance to corrosion and thermal fatigue, as well as strength at high temperature.

The airfoils 16 (FIG. 2) have end portions 40, 41, 42 and 43 which are adapted to be connected with the inner and outer shroud sections 12 and 14. End portions 40, 41 42 and 43 may be contour ground to achieve a precise shape. The airfoil 16 may also be provided with a central passage 44 through which a cooling fluid may be passed during operation of the turbine.

The inner shroud section 18 and the outer shroud section 19 (FIG. 3) are also formed of a superalloy. The shroud sections 18 and 19 could be made of the same alloy as the airfoil 16 (FIG. 2), or they could be made of a different alloy depending on the desired properties of the airfoils 16 and shroud sections 18 and 19. Thus the airfoils or blades 16 and the shroud sections 18 and 19 (FIG. 3) could have different physical properties.

In two different preferred embodiments of the invention, the shroud sections 18 and 19 have either of two microstructures. In one embodiment of the invention, the shroud sections 18 and 19 are formed of a single crystal by known casting techniques. In a second embodiment of the invention, the inner and outer shroud sections 18 and 19 are directionally solidified to form elongated grain boundaries which extend substantially parallel to the major side surfaces 20 and 22 of the shroud sections.

In the embodiment of the invention illustrated in FIG. 5, shroud sections 18 and 19 are directionally solidified. The elongated columnar grains in the shroud sections 18 and 19 extend from minor side or end surfaces 45 and 46 to the opposite minor side or end surfaces 47 and 48. Since the end surfaces 45, 46, 47 and 48 are connected with other shroud sections, a minimum number of grain ends are exposed to gas flow. The exposure of a minimum number of grain ends to gas flow is also promoted by having the elongated grain boundaries extend parallel to the major sides of the shroud sections. It is believed that this reduces any tendency for corrosion or thermal cracking to occur during high temperature use.

The inner shroud section 18 and the outer shroud section 19 have aligned openings 50, 52, 54, and 56 (FIG. 3) which are adapted to enclosure end portions 40, 41, 42, and 43 (FIG. 2) of the airfoils 16. The openings 50–56 (FIG. 3) extend between major side surfaces of each shroud section 18 and 19. The openings 50–56 may be cast undersize and subsequently machined to a shape corresponding to the shape of the end portions 40–43 (FIG. 2) of the airfoils 16. The machining of the openings 50–56 (FIG. 3) may be accomplished by conventional electrical discharge machining to provide an opening having five thousandths of an inch (0.005 in.) clearance with the end portions 40, 41, 42, and 43 (FIG. 2) of the airfoils 16. The sidewalls 60, 62, 64, and 66 (FIG. 3) of openings 50, 52, 54, and 56 respectively, hold the airfoils 16 (FIG. 2) in exact position and resist any tendency of the airfoils to twist relative to the shroud sections 18 and 19.

When the airfoils 16 (FIG. 2) are to be connected with the shroud sections 18 and 19, it is important that the opening 50 (FIG. 3) in the shroud section 19 be in exact alignment with the opening 54 in the shroud 18. Similarly, the opening 52 in the shroud section 19 should be in exact alignment with the opening 56 in the shroud section 18. In order to provide for proper gas flow, the major side surface 20 of the shroud section 18 should be exactly positioned relative to the major side surface 22 of the shroud section 19.

In order to be certain that the desired spatial relationship is present between the shroud sections 18 and 19 when the airfoils 16 are connected with the shroud sections, the shroud sections are temporarily interconnected by spacer bars 70 and 72 (FIG. 3). Although they could be formed separately, the spacer bars 70 and 72 are integrally cast with the shroud sections 18 and 19. The spacer bars 70 and 72 provide a rigid link between the inner shroud section 18 and the outer shroud section 19 to hold the shroud sections in a fixed spatial relationship before and while the airfoils 16 are being connected with the shroud sections. The spacer bars 70 and 72 (FIG. 3) maintain openings 50 and 52 in the outer shroud section 19 in precise alignment with the openings 54 and 56, respectively, in the inner shroud section 18.

The spacer bars 70 and 72 are substantially identical and consequently only the spacer bar 70 will be described in detail. However, it will be understood that the description of the spacer bar 70 applies as well to the spacer bar 72. The spacer bar 70 includes two horizontal bars 74 and 76 interconnected by a diagonal bar 78 which extends between opposite ends 80 and 82 of the horizontal bars 74 and 76 respectively. The horizontal bars 74 and 76 extend perpendicular to the major side surfaces 20 and 22 of the shroud sections 18 and 19 respectively. The bars 74 and 76 are accurately cast with their ends integrally formed with the shroud sections 18 and 19. This construction enables the rigid spacer bars 70 and 72 to rigidly hold the shroud sections 18 and 19 in the desired spatial relationship shown in FIG. 3.

After the shroud sections 18 and 19 have been formed with the spacer bars 70 and 72 connected between them and the openings 50–56 have been machined to the proper size, the airfoils 16 (FIG. 2) are connected with the shroud sections 18 and 19 (FIG. 3). In accomplishing this, the airfoils 16 are inserted axially through the openings 50 and 52 in the outer shroud section 19 and into the openings 54 and 56 respectively in the inner shroud section 18 (FIGS. 3 and 4). If desired, a short wire (not shown) may be tack welded across the ends of the airfoils to maintain them in position temporarily.

Next the airfoils 16 are joined to the shroud sections 18 and 19. The connection between the airfoils 16 and the inner and outer shroud sections 18 and 19 may be accomplished by a welding operation, such as high temperature brazing. During the brazing operation a filler material compatible with the superalloys of which the airfoils 16 and the inner and outer shroud sections 18 and 19 are commposed is melted to fill the small clearance space between the ends 40, 41, 42 and 43 (FIG. 2) of the airfoils 16 and the openings 50, 52, 54 and 56 in the shroud sections 18 and 19. Commercially available fillers are suitable and are made of powdered metals bound together by an acrylic binder to form a ribbon or a wire. The filler metal is applied to the joints and then the shroud sections 18 and 19 and the airfoils 16 are placed together in a suitable furnace where the brazing takes place.

Once the airfoils 16 have been brazed in place (FIG. 4), the spacer bars 70 and 72 are removed (see FIG. 5). This forms a complete turbine segment 26 ready to be joined with others to form the turbine component 10 (FIG. 1). Thus, the end surfaces 45, 46, 47 and 48 on the shroud sections 18 and 19 (FIG. 5) of a plurality of turbine segments 26 are assembled to form the annular turbine component 10 of FIG. 1. This results in a plurality of inner shroud sections 18 being fixedly interconnected to form the circular inner shroud 12 and a plurality of outer sections 19 being fixedly interconnected to form the circular outer shroud 14.

As a result of the directional solidification casting techniques used to form the airfoils 16 (FIG. 5), the elongated grain boundaries in the airfoils are substantially parallel to the arrows 84 of FIG. 5 and the leading and trailing edges 36 and 38 of the airfoils. The shroud sections 18 and 19 have been directionally solidified to form an elongated columnar grain structure in which the grain boundaries extend parallel to the arrows 86 of FIG. 5. This results in the grain boundaries in the shroud sections 18 and 19 extending parallel to the major side surfaces 20 and 22 between which hot gases flow and perpendicular to the grain boundaries in the airfoils 16.

By forming the shroud sections 18 and 19 with grain boundaries extending parallel to the arrows 86 (FIG. 5), the number shroud grain ends exposed to hot gases during use of the turbine component 10 is minimized. Similarly, by forming the airfoils 16 with grain boundaries extending parallel to the arrows 84 (FIG. 5), the number of airfoil grain ends exposed to hot gases during use of the turbine component 10 is minimized. Minimizing the number of grain ends exposed to the hot gases during operation of the turbine component 10 tends to maximize the high temperature strength and corrosion resistance of the turbine segment 26.

If the shroud sections 18 and 19 had been integrally cast with the airfoils 16 and the whole structure directionally solidified, a large number of grain ends in either the airfoils or shroud sections would be exposed to the hot gases. Thus, if the grain direction in an integrally cast turbine segment 26 was parallel to the arrows 86 in FIG. 5, a large number of grain ends would be exposed to hot gases at the leading and trailing edges 36 and 38 of the airfoils 16. Similarly, if the grain direction in an integrally cast turbine segment 26 was parallel to the arrows 84 in FIG. 5, a large number of grain ends would be exposed to hot gases at the major side surfaces 20 and 22 of the shroud sections 18 and 19. By forming the turbine segment 26 of separately cast and directionally solidified parts, the direction of the elongated grain boundaries in the shroud sections can be oriented transversely to the direction of the elongated grain boundaries in the airfoils to minimize the number of grain ends exposed to hot gases during use of the turbine component 10.

A completed turbine component or assembly 10 (FIG. 8) is formed by a circular array of turbine segments 26 which are assembled with the end surfaces 45, 46, 47 and 48 (FIG. 5) abutting by connecting the segments with inner and outer rings which hold them in place. The segments 26 are interconnected so that the grain boundaries and lines of greatest strength in the shrouds 12 and 14 extend around the shrouds and are parallel to both the major side surfaces of the shrouds and the circumferential circular axes indicated by the arrows 86 (FIG. 5). The lines of greatest strength and the grain boundaries in the airfoils 16 extend radially and are indicated by the arrows 84.

The completed turbine component 10 (FIG. 8) is relatively strong and can withstand relatively large operating stresses. This is because the elongated grain boundaries in both the shrouds 12 and 14 and the airfoils 16 are oriented in directions transverse to the directions of the major gas pressure operating loads to which these parts are subjected. The shrouds 12 and 14 and airfoils 16 have improved corrosion resistance and strength to resist sending loads and thermal stresses. The airfoils 16 are subjected to gas flow force loadings at the edges and along the major side surfaces of the airfoils in directions extending generally perpendicular to the leading and trailing edges 36 and 38 (FIG. 5) of the airfoils. The grain boundaries in each of the airfoils 16 extend parallel to the leading and trailing edges (as indicated by the arrows 84 in FIG. 8) to enable the airfoils to withstand relatively large operating gas pressure forces.

In the embodiment of the invention in which each of the shroud sections 18 and 19 is formed as a single crystal, the circular shrouds 12 and 14 are each formed as an annular array of crystals by assembling a plurality of shroud segments 26. Of course, the single crystal shroud sections 18 and 19 do not have grain boundaries and therefore have good high temperature corrosion resistance. By forming the single crystal shroud sections 18 and 19 with the direction of crystal growth parallel to the direction of the operating loads to which the shroud sections are subjected, the strength of a turbine component having single crystal shroud sections is promoted. Accordingly, the direction of crystal growth in the single crystal shroud section 18 is from one end surface, for example the end surface 45 (FIG. 5), to the opposite end surface, the surface 47 in the example. The direction of this crystal growth is parallel to major side surface 20 of the shroud section 18. The single crystal of the shroud section 19 is grown in the same manner as the single crystal of the shroud section 18, that is from the end surface 46 to the end surface 48 in a direction parallel to the major side surface 22.

When a plurality of segments 26 having single crystal inner and outer shroud sections 18 and 19 are interconnected to form a turbine engine component 10, the direction of crystal growth in the circular shrouds 12 and 14 is parallel to the arrows 86 of FIG. 8. This results in the direction of crystal growth in the shrouds 12 and 14 being transverse to the direction of the operating loads to maximize the ability of the shrouds to withstand the operating loads. It should be noted that although the shrouds 12 and 14 are each formed by a plurality of interconnected single crystal sections, the airfoils 16 extending between the single crystal shroud sections 18 and 19 are directionally solidified to have grain boundaries extending parallel to the arrows 84 in FIG. 8 and to the leading and trailing edges of the airfoils. However, it is contemplated that the airfoils could also be formed of a single crystal.

As previously mentioned, the spacer bars 70 and 72 (FIGS. 3 and 4) are advantageously integrally formed with the shroud sections 18 and 19. This may be accomplished by a lost wax or investment casting technique. In this process wax pattern pieces having the same configuration as the desired configuration of the shroud sections 18 and 19 are formed in a conventional manner. Wax spacer bars having the same configuration as the spacer bars 70 and 72 are attached to the wax patterns of the shroud sections while the wax patterns are held in the desired spatial relationship. The pattern assembly is dipped in a slurry of refractory ceramic material, and the slurry is allowed to dry. The dipping and drying are repeated until a coating of sufficient thickness is built up. It should be noted that the wax patterns of the spacer bars 70 and 72 hold the wax patterns of the shroud sections against movement relative to each other during the dipping process.

Thereafter the coated pattern assembly is placed in a furnace and baked to harden the ceramic material and to melt out the wax pattern pieces. This results in a cavity which has the shape of the inner and outer shroud segments and the spacer bars 70 and 72. Molten metal s poured to into the cavity and directionally solidified to form the spacer bars and shroud segment as an integral unit.

After the shroud sections 18 and 19 have been formed with the spacer bars 70 and 72 interconnecting them, the airfoils 16 (FIG. 4) may be inserted and the entire assembly placed in an oven for brazing without taking special precautions to assure the proper alignment of the shroud segments 12 and 14. If desired, the shroud sections 18 and 19 could be separately cast and then spacer bars welded in place while the shroud segments are supported in an appropriate jig.

The airfoils 16 are also formed by a lost wax or investment casting technique. Thus, a wax airfoil pattern is covered with ceramic mold material. After the mold material has hardened, the wax pattern is destroyed to provide a mold cavity having the same configuration as the airfoil 16. Molten metal is subsequently poured into the airfoil mold cavity and directionally solidified to form the airfoil 16.

The inner and outer shroud sections 18 and 19 have openings 50–56 which extend all the way through the shroud sections. The openings 50–56 enable the airfoils 16 to be inserted into the space between the shroud sections 18 and 19 while the shroud sections are held against movement relative to each other by the spacer bars 70 and 72. However, it is contemplated that it may be preferred to mount the end portions of the airfoils in sockets formed in the shroud sections. When this is done, the spacer bars 70 and 72 cannot be integrally formed with each shroud section since the spacing between the shroud sections must be varied in order to mount the airfoils in the sockets.

An embodiment of the invention in which the airfoils are mounted in sockets formed in the shroud sections is illustrated in FIG. 6. Since the embodiment of the invention shown in FIG. 6 is generally similar to the embodiment of the invention illustrated in FIGS. 2–5, similar numerals will be utilized to designate similar components, the suffix letter "a" being associated with FIG. 6 in order to avoid confusion.

In the embodiment of the invention illustrated in FIG. 6, the turbine segment 26a includes an inner shroud section 18a having sockets 100 and 102 (FIG. 6) which extend part way through the inner shroud section. The sockets 100 and 102 extend inwardly from the radially outer major side surface 20a of the inner shroud section 18a. Corresponding sockets (not shown) are formed on the inner major side surface 22a of the outer shroud section 19a. The sockets 100 and 102 and those formed in the outer shroud section 112 have bottom surfaces 116 and 118 which face the opposite shroud segment.

When sockets 100 and 102 which have bottom surfaces 116 and 118 are utilized, the spacer bars 70a and 72a must be attached to the shroud sections 18a and 19a after the airfoils 120 have been inserted into the sockets. The airfoils 120 are provided with end surfaces 122 and 124 which abuttingly engage the bottom surfaces 116 and 118 of the sockets 100 and 102 respectively. Opposite end faces 126 and 128 engage the bottom of the sockets (not shown) in the outer shroud segment 112. After the end surfaces 122, 124, 126 and 128 on the airfoils 120 have been positioned in abutting engagement with the bottoms of the sockets, the spacer bars 70a and 72a are attached to the shroud sections by welding operation.

Figure 7:
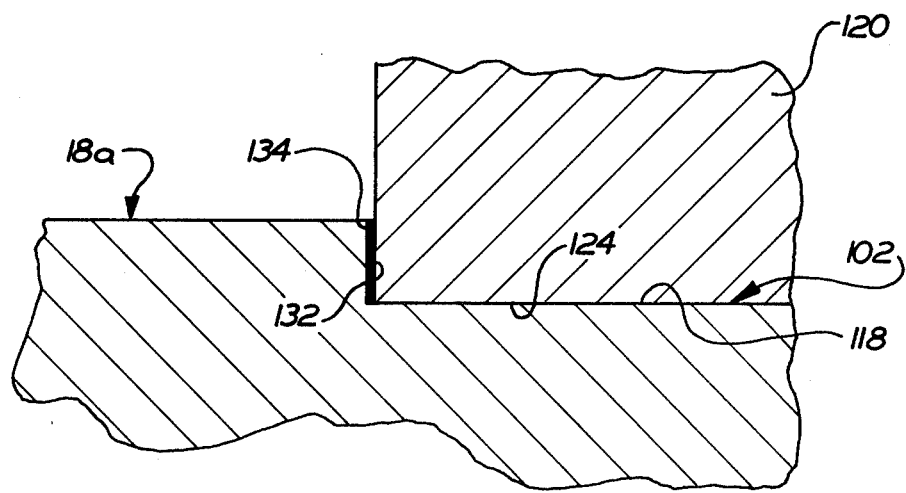
FIG. 7 is an enlarged fragmentary sectional view of a portion of a socket and an airfoil of FIG. 6.

A portion of the socket 102 and airfoil 120 is shown in FIG. 7. In order to achieve exact alignment of the shroud segment 18a and the airfoils 120, the end 124 of the airfoil 120 must be in close engagement with the bottom 118 of the socket 102. Therefore none of the filler metal used in the brazing process is applied to the bottom 118 of the socket 102. Instead the filler metal 134 is applied to the gap between the side surface 132 of the socket 102 and the airfoil 120 and may flow into a small gap at the bottom of the socket. During the welding process, the shroud sections 18a and 19a are held in the desired spatial relationship with each other and the airfoils 120 by the spacer bars 70a and 72a. After the airfoils 120 have been brazed or otherwise connected to the shroud sections 18a and 19a, the spacer bars 70a and 72a are disconnected from the shroud sections.

It is also contemplated by the present invention that one shroud segment, i.e., the inner shroud segment 18a, could be provided with sockets 100 and 102. At the same time the outer shroud section 19a could be provided with openings similar to the openings 50 and 52 of FIG. 3. If this is done the shroud segments may be integrally formed with the spacer bars 70a and 72a.

The shroud sections 18a and 19a of FIG. 6 are directionally solidified to have elongated grain boundaries extending parallel to the major side surfaces of the shroud sections. However, each of the shroud sections 18a and 19a could be formed as a single crystal if desired. The airfoils 120 are directionally solidified in the same manner as the airfoils 16.

Although the shrouds 12 and 14 (FIG. 1) have been described as being radially spaced apart, it is contemplated that the shrouds could be axially spaced apart in the manner shown schematically in FIG. 9. In the embodiment of FIG. 9, the circular shrouds 140 and 142 are coaxial and axially spaced from each other. An annular array of airfoils 144 is disposed between the axially inner shroud 140 and the axially outer shroud 142. The airfoils 144 have a microstructure in which the grain boundaries are parallel to the leading and trailing edges as indicated by the arrows 146 and 148 in FIG. 9. As in the previous embodiments, the shrouds 140 and 142 are formed of a plurality of sections each of which consists of a single crystal, or the shrouds may have a microstructure in which the grain boundaries are circumferentially oriented, i.e., parallel to the circular axes indicated by the arrows 150 and 152.

In view of the foregoing description, it is apparent that the present invention provides a new and improved method of making a new and improved turbine engine component 10. The turbine engine component 10 includes an annular array of airfoils 16 which are connected with inner and outer shrouds 12 and 14. The airfoils 16 are cast separately from the shrouds. This allows the airfoils 16 to be directionally solidified according to known techniques. The directional solidification results in an elongated columnar grain structure with grain boundaries extending parallel to the leading and trailing edges 36 and 38 of the airfoils 16.

The circular inner and outer shrouds 12 and 14 are advantageously formed of a plurality of arcuate sections 18 and 19. In accordance with a feature of the invention, shroud sections 18 and 19 may be cast and directionally solidified to form an elongated, columnar grain structure. The ends 45, 46, 47 and 48 of the arcuate shroud sections 18 and 19 are arranged in such an orientation that the grain boundaries extend circumferentially around the circular shrouds 12 and 14. By orienting the grains in this direction, the ends of grains are not exposed to the hot flow of gases to enhance the resistance of the shroud sections to corrosion and thermal fatigue. Although the directionally solidified shroud sections 18 and 19 may be connected with any desired type of airfoil 16, they are advantageously used with directionally solidified airfoils.

In another embodiment of the invention, each of the arcuate shroud sections 18 and 19 is formed of a single crystal. By forming each arcuate shroud section 18 and 19 as one crystal, the high temperature strength and corrosion resistance of the shroud section is enhanced. The single crystal shroud sections 18 and 19 are interconnected to form circular inner and outer shrouds 12 and 14 which are connected with airfoils. This results in the shrouds 12 and 14 each being formed by an annular array of single crystal sections.

In accordance with still another feature of the present invention, the forming of a shroud segment 26 which includes a pair of arcuate shroud sections 18 and 19 and one or more airfoils 16 is greatly facilitated by using a spacer bar 70 or 72. The spacer bar 70 holds the shroud sections 18 and 19 in a fixed spatial relationship relative to each other while airfoils 16 are connected with the shroud sections. Once the airfoils 16 have been connected with the shrouds sections, which may be done by brazing them in place, the spacer bar 70 is removed. In one embodiment of the invention, the spacer bar 70 and a pair of arcuate shroud sections 18 and 19 are cast as one piece. In another embodiment, the spacer bar 70a is formed separately from and subsequently connected with, the shroud sections 18a and 19a.

Having described one specific preferred embodiment of the invention, the following is claimed:

1. An assembly comprising a first circular shroud formed of metal, a second circular shroud coaxial with said first circular shroud and formed of metal, and an annular array of metal airfoils extending between and connected with said first and second circular shrouds, said first shroud having an elongated columnar gain structure with gain boundaries extending circumferentially around said first shroud, said second shroud having an elongated columnar gain structure with grain boundaries extending circumferentially around said second shroud, each of said airfoils having an elongated columnar grain structure with grain boundaries extending in a generally radial direction relative to said first and second shrouds.

2. An assembly comprising a first circular shroud formed of metal, a second circular shroud coaxial with said first circular shroud and formed of metal, and an annular array of metal airfoils extending between and connected with said first and second circular shrouds, said first shroud having an elongated columnar grain structure with grain boundaries extending circumferentially around said first shroud, said second shroud having an elongated columnar grain structure with grain boundaries extending circumferentially around said second shroud, each of said airfoils having an elongated columnar grain structure with grain voundaries extending in a generally axial direction relative to said first and second shrouds.

3. An assembly comprising a metal inner shroud section having a first opening adapted to receive an end portion of an airfoil, a metal outer shroud section having a second opening adapted to receive an end portion of the airfoil, an airfoil having opposite end portions disposed in the openings in said inner and outer shroud sections, said airfoil being formed of a material in which the grain boundaries are substantially parallel to a leading edge portion of said airfoil, said shroud sections having microstructures with growth directions which extend transversely to the leading edge portion of said airfoil, and a rigid metal spacer bar connected with said inner and outer shroud sections to maintain said inner and outer shroud sections in a predetermined spatial relationship with each other and to maintain said first and second openings in alignment with each other.

4. An assembly as set forth in claim 3 wherein said inner and outer shroud sections are each formed of a single crystal of metal.

5. An assembly comprising a first metal shroud section formed of a single crystal, a second metal shroud section formed of a single crystal, said first and second shroud sections being formed of a single crystal having a growth direction parallel to major side surfaces of said inner and outer shroud sections, a metal airfoil extending between and connected with said first and second shroud sections, said airfoil having leading and trailing edges and an elongated columnar grain structure with grain boundaries extending substantially parallel to said leading and trailing edges.

6. An assembly as set forth in claim 5 further including a spacer bar connected with said inner and outer shroud sections to maintain said inner and outer shroud sections in a predetermined spatial relationship with each other.

7. An assembly comprising a first circular shroud formed of metal, a second circular shroud coaxial with said first circular shroud and formed of metal, and an annular array of metal airfoils extending between and connected with said first and second circular shrouds, said first shroud having an elongated columnar grain structure with grain boundaries extending circumferentially around said first shroud, said second shroud having an elongated columar grain structure with grain boundaries extending circumferentially around said second shroud, each of said airfoils having leading and trailing edges extending transversely to said first and second shrouds and an elongated columnar grain structure with grain boundaries extending generally parallel to said leading and trailing edges.

8. An assembly as set forth in claim 7 wherein said first circular shroud is disposed radially inward of said second circular shroud.

9. An assembly as set forth in claim 7 wherein said first circular shroud is axially spaced from said second circular shroud.

10. An assembly comprising a first circular shroud formed of metal, a second circular shroud coaxial with said first circular shroud and formed of metal, and an annular array of metal airfoils extending between and connected with said first and second circular shrouds, said first shroud having an elongated columnar grain structure with grain boundaries extending circumferentially around said first shroud, said second shroud having an elongated columnar grain structure with grain boundaries extending circumferentially around said second shroud, each of said airfoils has an elongated columnar grain structure with grain boundaries extending transversely to the grain boundaries in said first and second shrouds.

11. An assembly as set forth in claim 10 wherein each of said airfoils has a first end portion welded to said first shroud and a second end portion welded to said second shroud.

12. An assembly as set forth in claim 11 wherein said first and second shrouds include means for defining a plurality of sockets, said first and second end portions of said airfoils being disposed in said sockets.

13. An assembly comprising a first metal shroud section, a second metal shroud section, and a metal airfoil formed separately from, extending between and connected with said first and second shroud sections, said airfoil having a leading edge portion and a microstructure with a growth direction which extends generally parallel to said leading edge portion of said airfoil, said first and second shroud sections having microsturctures with growth directions which extend transversely to said leading edge portion of said airfoil.

14. An assembly as set forth in claim 13 wherein said first and second shroud sections have an elongated columnar grain structures with grain boundaries extending transversely to said leading edge portion of said airfoil.

15. An assembly as set forth in claim 13 wherein said first and second shroud sections are each formed as single crystals having growth directions which extend transversely to the leading edge portion of said airfoil.

16. An assembly comprising a first circular shroud formed of metal, a second circular shroud coaxial with said first circular shroud and formed of metal, each of said shrouds being formed by a plurality of interconnected sections, each of said shroud sections being formed of a single crystal of metal, and an annular array of metal airfoils extending between and connected with said first and second circular shrouds, each of said airfoils having leading and trailing edges extending transversely to said first and second shrouds and an elongated columnar grain structure with grain boundaries extending generally parallel to said leading and trailing edges of the airfoils and transversely to the first and second shrouds.

17. An assembly as set forth in claim 16 wherein each of said airfoils has an elongated columnar grain structure with grain boundaries extending in a generally radial direction relative to said first and second shrouds.

18. An assembly as set forth in claim 16 wherein each of said airfoils has an elongated columnar grain structure with grain boundaries extending in a generally axial direction relative to said first and second shrouds.

19. An assembly as set forth in claim 16 wherein each of said airfoils has a first end portion welded to said first shroud and a second end portion welded to said second shroud.

20. An assembly as set forth in claim 19 wherein said first and second shrouds include means for defining a plurality of sockets, said first and second end portions of said airfoils being disposed in said sockets.

21. An assembly comprising a first metal shroud section having an elongated columnar grain structure with grain boundaries extending along a first axis, a second metal shroud section having an elongated columnar grain structure with grain boundaries extending along a second axis, a metal airfoil extending between and connected with said first and second shroud sections, said airfoil having an elongated columnar grain structure with grain boundaries extending along a third axis which extends transversely to said first and second axes.

22. An assembly as set forth in claim 21 wherein said airfoil has leading and trailing edge portions, said third axis extending generally parallel to said leading and trailing edge portions.

23. An assembly as set forth in claim 21 wherein said first and second axes have arcuate configurations and are disposed in a coaxial relationship.

24. An assembly as set forth in claim 21 wherein said first and second shroud sections have major side surfaces which face toward each other to at least partially define a gas flow path, said first axis extending parallel to the major side surface of the first shroud section, said second axis extending parallel to the major side surface of said second shroud section.

25. An assembly as set forth in claim 21 further including a spacer bar connected with said inner and outer shroud sections to maintain said inner and outer shroud sections in a fixed spatial relationship with each other.

26. An assembly as set forth in claim 21 wherein each of said shroud sections forms a portion of a circle, said first and second axes extending circumferentially along the circles which are partially formed by said first and second shroud sections.

27. A method of making an assembly which includes an airfoil extending between inner and outer shroud sections, said method comprising the steps of providing metal inner and outer shroud sections interconnected by a spacer bar to maintain a predetermined spatial relationship between the inner and outer shroud section, said step of providing inner and outer shroud sections includes the steps of providing mold cavities having configurations corresponding to the configurations of the inner and outer shroud sections, pouring molten metal into the mold cavities and directionally solidifying the molten metal to form inner and outer shroud sections in which grain boundaries extend substantially parallel to major side surfaces of the shroud sections, providing a metal airfoil, said step of providing an airfoil includes the steps of providing a mold cavity having a configuration which is the same as the configuration of the airfoil, pouring molten metal into the airfoil mold cavity, and directionally solidifying the molten metal to form a metal airfoil in which the grain boundaries are substantially parallel to the leading edge of the airfoil, connecting opposite end portions of the airfoil to the inner and outer shroud sections while they are maintained in the predetermined spatial relationship with each other by the spacer bar, said step of connecting the airfoil with the inner and outer shroud sections including the step of connecting the airfoil to the inner and outer shroud sections with the grain direction in the airfoil extending transversely to the grain direction in the shroud sections, and thereafter disconnecting the spacer bar from the shroud sections.

28. A method of making an assembly which includes a metal airfoil extending between inner and outer metal shroud sections, said method comprising the steps of providing separate inner and outer metal shroud sections, said step of providing separate inner and outer metal shroud sections includes the step of providing inner and outer metal shroud sections each having a grain structure in which the grain boundaries are substantially parallel to major said surfaces of the inner and outer shroud sections, providing a metal airfoil, said step of providing an airfoil includes the step of providing an airfoil having a grain structure in which the grain boundaries are substantially parallel to a leading edge portion of the airfoil, positioning opposite end portions of the airfoil in engagement with the inner and outer shroud sections, providing a metal spacer bar, connecting the spacer bar to the inner and outer shroud sections with opposite end portions of the airfoil in engagement with the inner and outer shroud sections to maintain a predetermined spatial relationship between the airfoil and the inner and outer shroud sections, connecting the opposite end portions of the airfoil with the inner and outer shroud sections while maintaining the predetermined spatial relationship between the inner and outer shroud sections with the spacer bar, and disconnecting the spacer bar from the inner and outer shroud sections after performing said step of connecting the airfoil with the inner and outer shroud sections.

29. A method of making an assembly which includes an airfoil extending between inner and outer shroud sections, said method comprising the steps of providing metal inner and outer shroud sections interconnected by a spacer bar to maintain a predetermined spatial relationship between the inner and outer shroud sections, said step of providing inner and outer shroud sections includes the step of casting inner and outer shroud sections having a structure in which the grain direction is substantially parallel to major side surfaces of the shroud sections, providing a metal airfoil, said step of providing an airfoil includes the step of providing a cast airfoil having a grain direction which is substantially parallel to the leading edge of the airfoil, connecting opposite end portions of the airfoil to the inner and outer shroud sections while they are maintained in the predetermined spatial relationship with each other by the spacer bar, and thereafter disconnecting the spacer bar from the shroud sections.

30. A method as set forth in claim 29 wherein said step of casting inner and outer shroud sections includes the step of casting inner and outer shroud sections with openings adapted to receive the opposite end portions of an airfoil, and said step of connecting opposite end portions of an airfoil to the inner and outer shroud sections includes the step of inserting end portions of the airfoil in the openings in the shroud sections.

31. A method as set forth in claim 30 wherein said step of connecting opposite end portions of the airfoil to the inner and outer shroud sections includes the step of welding the end portions of the airfoil to the shroud sections.

32. A method as set forth in claim 29 wherein said step of providing inner and outer shroud sections includes the step of providing a shroud section having an opening which extends through the shroud section, said method further including the step of inserting the airfoil through the opening, said step of connecting opposite end portions of the airfoil to the shroud sections being performed after said step of inserting the airfoil through the opening.

33. A method of making an assembly which includes an airfoil extending between inner and outer shroud sections, said method comprising the steps of providing metal inner and outer shroud sections having major side surfaces, said step of providing inner and outer shroud sections includes the steps of providing mold cavities having configurations corresponding to the configurations of the inner and outer shroud sections, pouring molten metal into the mold cavities, and solidifying the molten metal in directions which extend substantially parallel to major side surfaces of the shroud sections, providing a metal airfoil having a leading edge, said step of providing an airfoil includes the steps of providing a mold cavity having a configuration which is the same as the configuration of the airfoil, pouring molten metal into the airfoil mold cavity, and solidifying the molten metal in a direction which extends substantially parallel to the leading edge of the airfoil, and thereafter connecting opposite end portions of the airfoil to the inner and outer shroud sections, said step of connecting the airfoil with the inner and outer shroud sections including the step of connecting the airfoil to the inner and outer shroud sections with the leading edge of the airfoil extending transversely to the major side surface of the shroud sections.

34. A method as set forth in claim 33 wherein said step of solidifying the molten metal in directions which extend substantially parallel to the major side surfaces of the shroud sections includes the step of directionally solidifying the molten metal to form inner and outer shroud sections in which grain boundaries extend substantially parallel to major side surfaces of the shroud sections.

35. A method as set forth in claim 33 wherein said step of solidifying the molten metal in directions which extend substantially parallel to the major side surfaces fo the shroud sections includes the step of solidifying the molten metal to form the inner and outer shroud sections as single crystals.

36. A method as set forth in claim 33 wherein said step of solidifying the molten metal in a direction which extends substantially parallel to the leading edge of the airfoil includes the step of directionally solidifying the molten metal to form an air foil in which grain boundaries extend substantially parallel to the leading edge of the airfoil.

37. A method of making an assembly which includes a metal airfoil extending between inner and outer metal shroud sections, said method comprising the steps of providing separate inner and outer metal shroud sections, said step of providing inner and outer shroud sections includes the step of casting inner and outer shroud sections having a structure in which the grain direction is substantially parallel to major side surfaces of the shroud sections, providing a metal airfoil, said step of providing an airfoil includes the step of providing a cast airfoil having a grain direction which is substantially parallel to the leading edge of the airfoil, positioning opposite end portions of the airfoil in engagement with the inner and outer shroud sections, providing a metal spacer bar, connecting the spacer bar to the inner and outer shroud sections with opposite end portions of the airfoil in engagement with the inner and outer shroud sections to maintain a predetermined spatial relationship between the airfoil and the inner and outer shroud sections, connecting the opposite end portions of the airfoil with the inner and outer shroud sections while maintaining the predetermined spatial relationship between the inner and outer shroud sections with the spacer bar, and disconnecting the spacer bar from the inner and outer shroud sections after performing said step of connecting the airfoil with the inner and outer shroud sections.

38. A method as set forth in claim 37 wherein said step of providing inner and outer shroud sections includes the steps of providing an inner shroud section having a socket with an opening in a major side surface of the inner shroud section and a bottom surface facing toward the outer shroud section, said step of providing an outer shroud section including the step of providing an outer shroud section having a socket with an opening in a major side surface of the outer shroud section and a bottom surface facing toward the inner shroud section, said step of positioning opposite end portions of the airfoil in engagement with the inner shroud section includes the step of inserting one end portion of the airfoil into the socket in the inner shroud section, said step of positioning opposite end portions of the airfoil in engagement with the outer shroud section includes the step of inserting one end portion of the airfoil into the socket in the outer shroud section.

39. A method as set forth in claim 38 wherein said step of inserting one end portion of the airfoil into the socket in the inner shroud section includes the step of engaging the bottom surface of the socket with the one end portion of the airfoil, and said step of inserting one end portion of the airfoil into the socket in the outer shroud section includes the step of engaging the bottom surface of the socket with another end portion of the airfoil.

40. A method as set forth in claim 38 further including the step of limiting sidewise movement of the airfoil with the sockets.

41. A method as set forth in claim 37 wherein said step of connecting the spacer bar to the inner and outer shroud sections with opposite end portions of the airfoil in engagement with the inner and outer shroud sections includes the step of welding the spacer bar to the inner and outer shroud sections.

42. A method as set forth in claim 41 wherein said step of connecting opposite end portions of the airfoil with the inner and outer shroud sections includes the step of welding end portions of the airfoil to the inner and outer shroud sections.

43. A method as set forth in claim 42 wherein said step of disconnecting the spacer bar from the inner and outer shroud sections is performed after performance of said step of welding end portions of the airfoil to the inner and outer shroud sections.

* * * * *

UNITED STATES PATENT AND TRADEMARK OFFICE
CERTIFICATE OF CORRECTION

PATENT NO. : 4,464,094
DATED : August 7, 1984
INVENTOR(S) : John M. Gerken

It is certified that error appears in the above-identified patent and that said Letters Patent are hereby corrected as shown below:

Column 11, lines 25, 26 and 28, change "gain" to -- grain --.

Column 12, line 23, change "columar" to -- columnar --.

Column 14, line 11, change "section" to -- sections --.

Column 14, line 45, change "said" to -- side --.

Column 16, line 6, change "fo" to -- of --.

Signed and Sealed this

Twelfth Day of March 1985

[SEAL]

Attest:

DONALD J. QUIGG

Attesting Officer     Acting Commissioner of Patents and Trademarks